United States Patent [19]

Lai et al.

[11] Patent Number: 4,591,910
[45] Date of Patent: May 27, 1986

[54] HORIZONTAL PICTURE CENTERING

[75] Inventors: Stephen H. Lai, Arlington Heights; Gopal K. Srivastava, Buffalo Grove, both of Ill.

[73] Assignee: Zenith Electronics Corporation, Glenview, Ill.

[21] Appl. No.: 589,605

[22] Filed: Mar. 14, 1984

[51] Int. Cl.$^4$ ............................................. H04N 5/04
[52] U.S. Cl. .................................... 358/148; 358/158
[58] Field of Search ............... 358/148, 149, 158, 159, 358/243; 315/364, 370, 387, 398, 411

[56] References Cited

U.S. PATENT DOCUMENTS 4,317,133  2/1982  Fernsler et al. .................... 358/158

FOREIGN PATENT DOCUMENTS 58-68371  4/1983  Japan ................................ 358/148

*Primary Examiner*—James J. Groody
*Assistant Examiner*—Michael D. Parker

[57] ABSTRACT

This invention permits horizontal centering of a television picture on the screen. Signals normally present within a television receiver are used to generate intermediate signals for centering the picture. The method of operation provides satisfactory noise immunity while maintaining adequate display characteristics. A two loop system is used. The first loop receives the horizontal sync and generates an intermediate signal in response. The second loop variably delays the intermediate signal to create a signal which is phase locked to the flyback signal. In this fashion, the flyback signal may be made to be symmetric with the horizontal blanking interval rather than the horizontal sync pulse, thus centering the video information on the screen.

32 Claims, 9 Drawing Figures

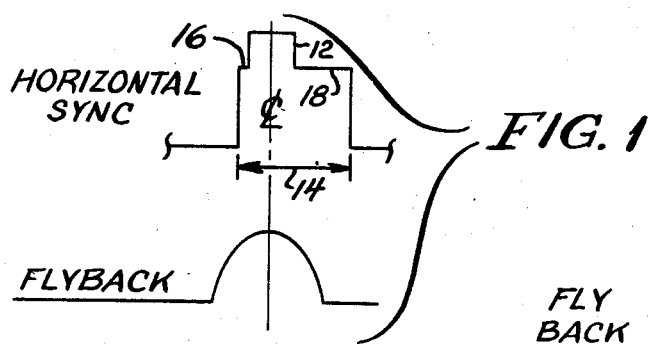
FIG. 1
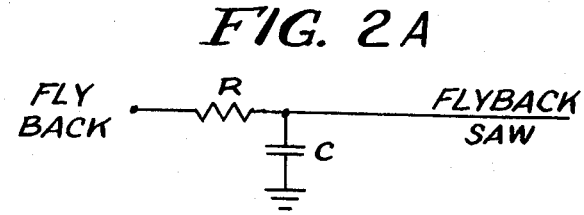
FIG. 2A
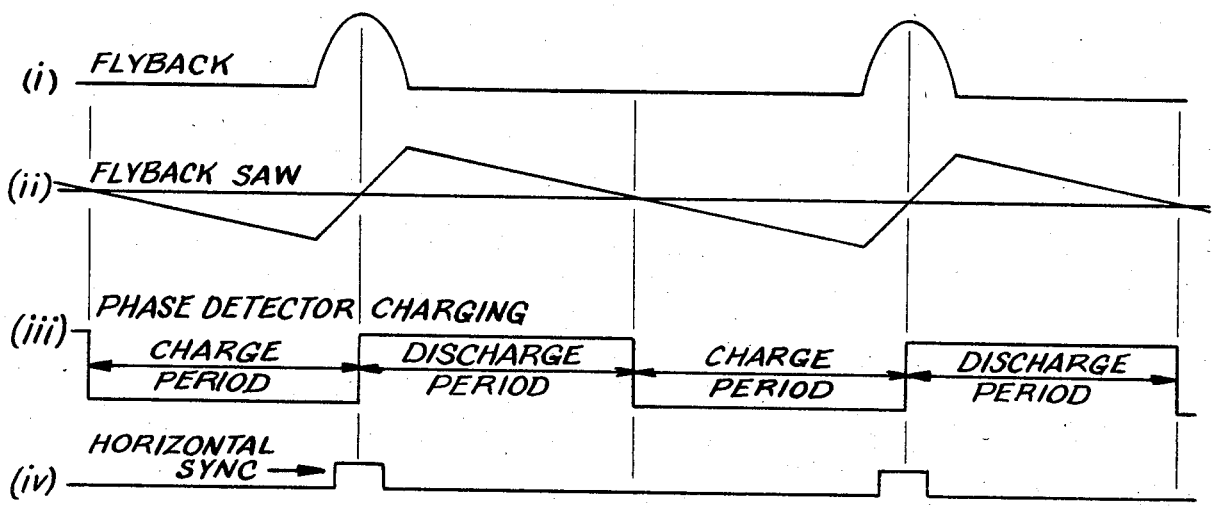
FIG. 2B
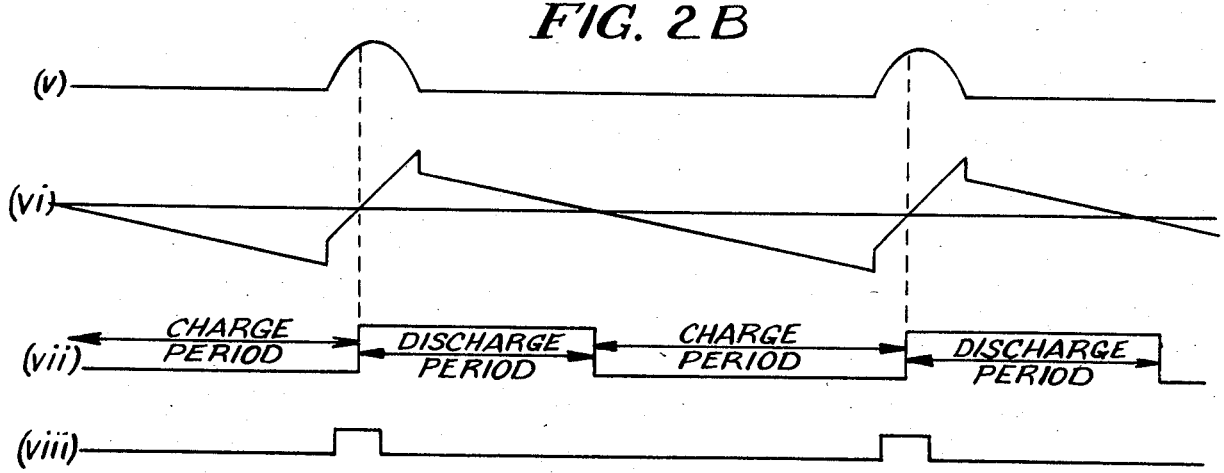
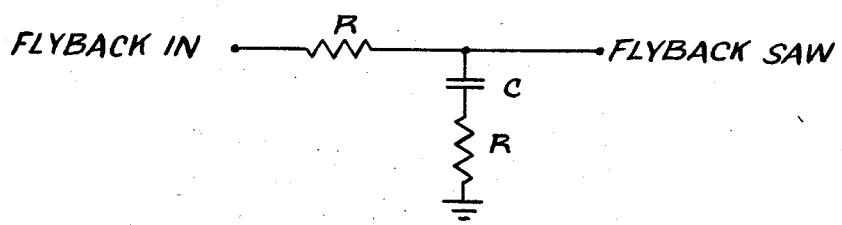

HORIZONTAL PICTURE CENTERING

BACKGROUND OF THE INVENTION

The present invention relates generally to the television art and to the reception and displaying of transmitted signals.

In the United States, transmitted television signals are governed by the N.T.S.C. which prescribes the specific timing requirements for the signals. The horizontal synchronizing information sent in the form of sync pulses on the same carrier signal as the video information is governed by these standards. As shown in FIG. 1, the N.T.S.C. horizontal sync information shown as a pulse 12 occurs during a horizontal blanking period 14. The horizontal sync pulse 12 has a duration of approximately 4.7 microseconds. The pulse has an associated front porch 16 of duration approximately one microsecond and a back porch 18 of duration approximately five microseconds. Thus, the horizontal sync pulse 12 is not symmetrical with respect to the horizontal blanking interval 14.

The video information received from the transmitted signal is displayed on the television screen through a raster-like scanning fashion. That is, the scanning beam sweeps horizontally across the screen for the length of one line. It then "flies back" to the left hand side of the television screen. This "flyback" period has approximately the same duration as the horizontal blanking period, approximately eleven microseconds. A signal representative of the flyback signal also is shown in FIG. 1.

In operation, the horizontal sync pulse is phased-locked to the flyback pulse so that the fly back occurs once per horizontal line at approximately the same time as the horizontal blanking period. A phase locked loop will put the horizontal sync in the center of the flyback pulse. Because the horizontal sync pulse is not centered in the horizontal blanking period, the video will not be centered on the screen with respect to the flyback signal. Video information will still be being transmitted at a time when the flyback begins. Consequently, some of the video information which would normally be at the right hand edge of the screen will now appear off the screen during the flyback period.

The prior art has made attempts to rectify this problem. The most common method for attempting to produce a flyback signal which is symmetrical with respect to the horizontal blanking interval is to create a sawtooth waveform from the flyback signal. This can be done using the integration circuit of FIG. 2A which produces the associated signal of waveform (ii). The sawtooth waveform is then used to phase lock with the sychronizing pulse. Specifically, the phase detector will center the horizontal sync pulses about the rising edge at which the phase detector changes polarity, i.e. the point at which it switches from charging to discharging, as is shown in waveforms (iii) and (iv) of FIG. 2A. However, this does not solve the problem because the sync pulse will then lock onto the AC center of the sawtooth waveform which is identical to the center of the flyback, so the problem persists.

One method for overcoming this difficulty is to introduce a DC offset to the sawtooth signal. This can be done using the circuit of FIG. 2B which then produces the associated sawtooth, waveform (vi). In this circuit the AC center is moved back in the period of the waveform. Because of this, the synchronizing pulse which occurs during the early part of the horizontal blanking interval will lock onto an earlier portion of the flyback signal. Thus, the flyback will occur more nearly symmetrically with the horizontal blanking interval instead of the horizontal synchronizing pulse itself.

Generally, because of the offset introduced to overcome the misalignment of the flyback and the horizontal blanking interval, the phase detector's charge period increases and its discharge period decreases as is shown in waveform (vii) of FIG. 2B. As mentioned above, the horizontal sync pulse is centered by the phase lock loop about the edge at which the phase detector changes from charging to discharging. The first half of the sync pulse occurs during the charge period and the second half during the discharge period. Accordingly, the filter capacitor is maintained in equilibrium. And, because the offset has effectively moved the AC center to an earlier point in the sawtooth waveform's period, the sync now leads in phase with respect to the flyback which causes the flyback to be move nearly aligned with the horizontal blanking interval as is desired.

Although this prior art method theoretically solves the picture centering problem, it significantly degrades the noise immunity performance of the horizontal phase lock loop. Thus, it is unacceptable. Noise by its very nature occurs randomly and therefore is more likely to occur during the charge period of the phase detector because the charge period is now longer than the discharge period. Consequently, the phase detector filter capacitor will charge up and offset the phase lock loop causing it to drift away in response to the noise which has randomly turned it on.

Thus, it is the principal object of the present invention to provide an apparatus and method for horizontally centering a displayed television picture without introducing an unacceptable noise susceptibility into the system.

It is a further object of the present invention that such horizontal picture centering be accomplished with a minimum of discrete components. It is an associated object of the present invention that its features be accomplished with a minimum of power consumption and cost.

It is still a further object of the present invention that provision be made to protect against default conditions likely during manufacture or trouble-shooting situations.

It is still a further object of the present invention to allow for the use of a minimum number of integrated circuit pins in connection with the disclosed circuitry.

BRIEF DESCRIPTION OF THE FIGURES

The features of the present invention which are believed to be novel are set forth with particularity in the appended claims. The invention, together with its objects and the advantages thereof, may best be understood by reference to the following detailed description taken in conjunction with the accompanying drawings in which like elements are indicated with like reference numerals and of which:

FIG. 1 is a representation of a flyback signal in juxtaposition with the horizontal sync pulse and horizontal blanking interval;

FIG. 2A is a schematic of a prior art circuit for producing a saw tooth from the flyback signal as shown with various illustrative waveforms;

FIG. 2B is a schematic and associated waveforms showing the offset for more nearly aligning the flyback with the horizontal blanking interval;

DESCRIPTION OF THE PREFERRED EMBODIMENT

One aspect of the preferred embodiment of the present invention is that it provides for picture centering in a second loop of a two loop horizontal phase lock loop system. In such a system, a first loop controls the frequency of a horizontal oscillator and maintains the frequency and phase of the oscillator's output with respect to the received sync. The second loop maintains the phase of the horizontal flyback signal, and thus the horizontal scan of the sweeping electron beam, with respect to the oscillator output and the corresponding received sync through the action of the first loop. For picture centering, a phase adjustment is introduced in the second loop. Both loops utilize phase detectors and low pass filters to correct for transitional noise in the system.

Figure 7:
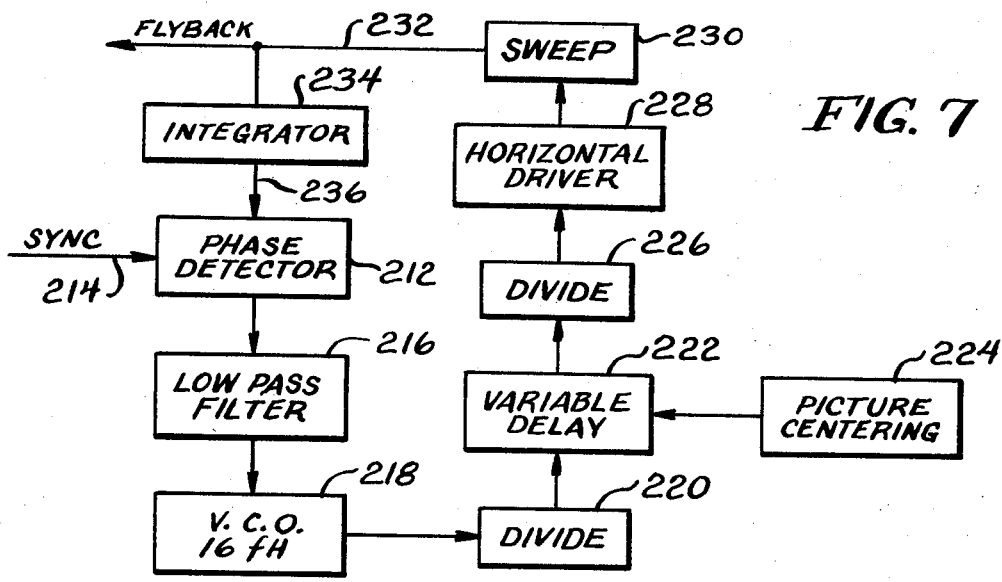
FIG. 7 is a block diagram representative of the application of the present invention to a single loop horizontal phase lock loop system.
Figure 8:
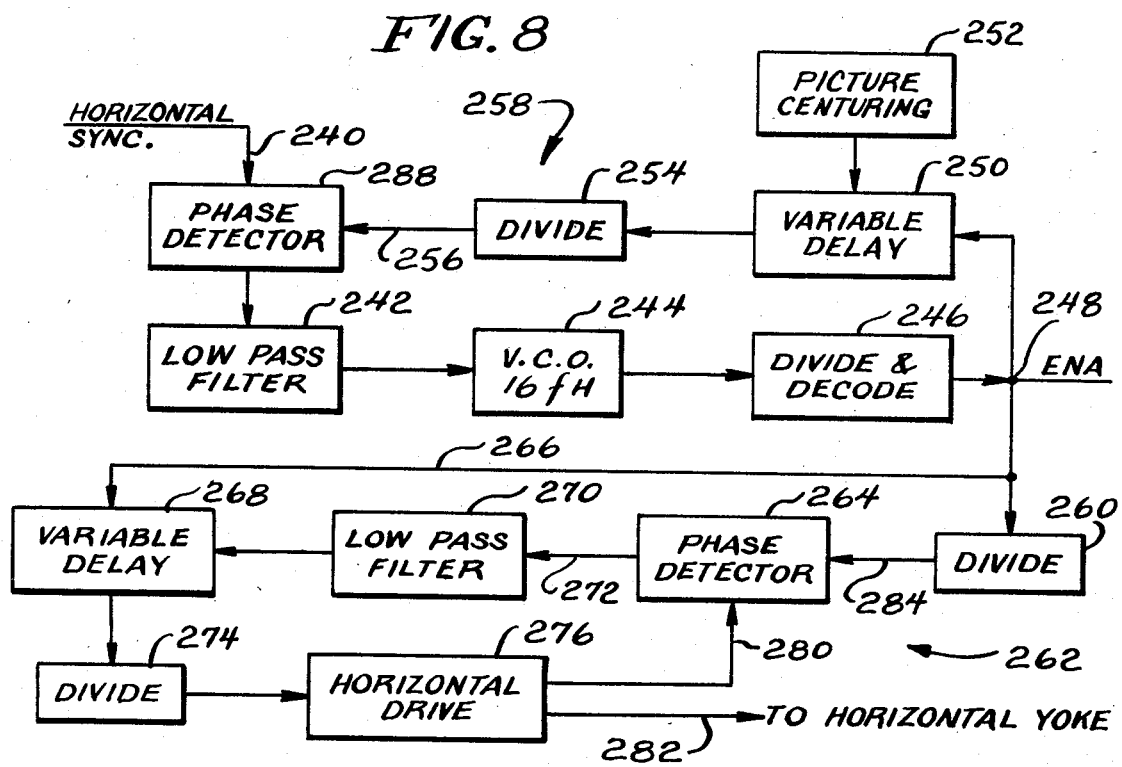
FIG. 8 is a block diagram illustrating the application of the present invention to a second two loop embodiment.

However, the present invention need not be implemented in a two loop system. A second embodiment, as illustrated in FIG. 7, employs picture centering according to the present invention in a single loop horizontal phase lock loop system. Also, the picture centering need not be always implemented in the second loop of a two loop system. FIG. 8 illustrates a third embodiment of the present invention in which the picture centering function is performed in the first loop of a two loop system. These alternative embodiments will be discussed subsequently.

Figure 3:
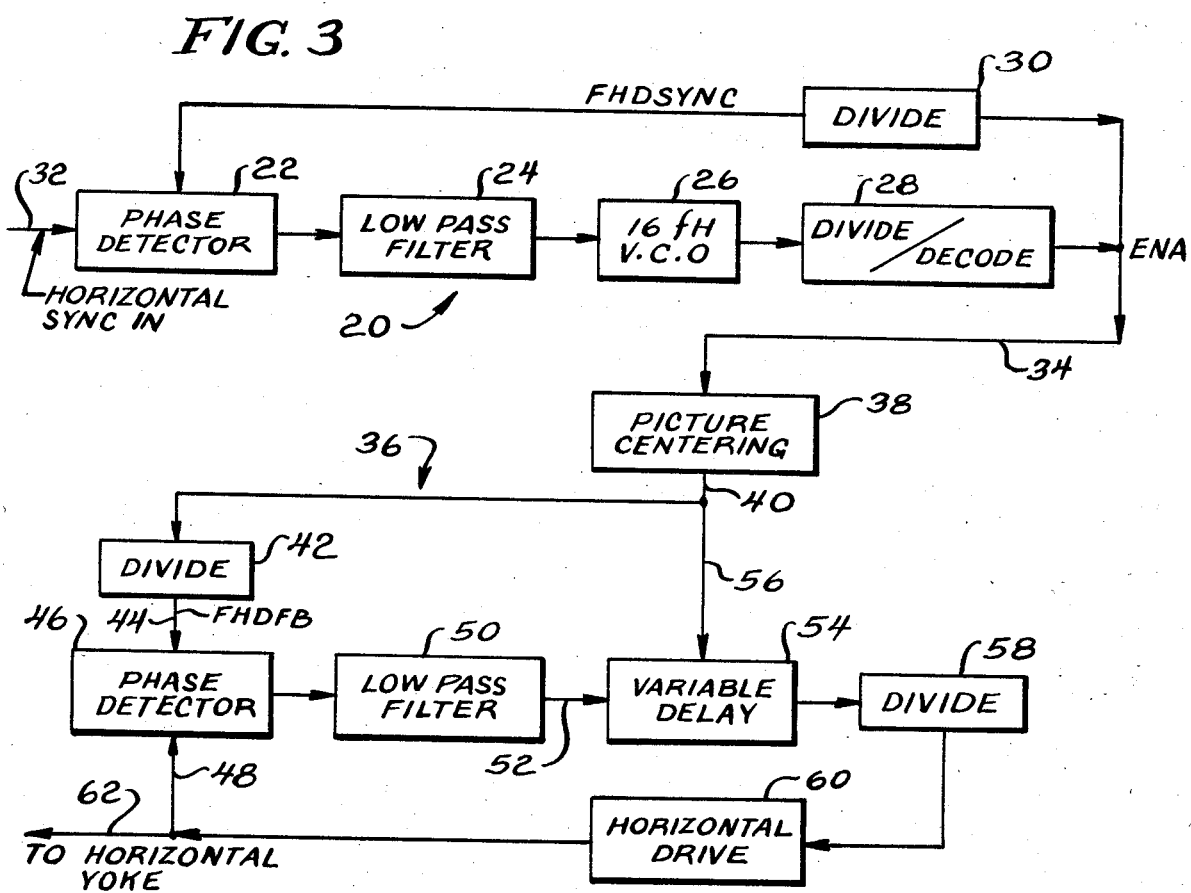
FIG. 3 is a block diagram representation of the preferred embodiment of the present invention.

Referring now to FIG. 3, therein is shown a symbolic block diagram of the two loop system of the preferred embodiment. Generally, a first loop 20 consists of a phase detector 22, a low pass filter 24, a voltage control oscillator 26, and a divide and decode logic circuit 28 to produce a sync-derived enabling signal, ENA. A further divide circuit 30 is shown to process the enabling signal ENA to complete the loop. In operation, loop 20 receives the horizontal sync on a line 32 through phase detector 22. The phase detector 22 locks the horizontal sync in phase with the signal FHDSync from divide circuit 30. The resultant signal is then passed to low pass filter 24 which has a relatively slow time constant so that the loop 20 does not respond rapidly to fluctuations in the received horizontal sync signal created by noisy conditions. The signal from the low pass filter 24 controls the frequency and phase of the 16 fH voltage control oscillator 26 (fH is the horizontal frequency of the video signal.) The oscillators output, 16 fH, is then processed through the divide/decode logic circuit 28 to produce the enabling signal ENA having a 2 fH frequency on a line 34 for use in the second loop.

The divide/decode circuit 28 divides the output of the voltage controlled oscillator 26 by a factor of eight. Thus, it is necessary to further divide the enabling signal ENA to complete the loop. This is done in a divide circuit 30 which produces a loop 20 reference signal, FHDSync. The signal FHDSync is then used as a reference in the initial phase detector 22 as explained above for phase locking with the horizontal sync signal received on line 32.

A second loop 36 as shown in FIG. 3 receives the ENA signal on line 34 from loop 20. This is received at a picture centering circuit 38 (which is generally a variable delay circuit having an externally controlled, discrete potentimeter for adjusting the phasing of the picture centering circuit, as explained more thoroughly below). This circuit operates on the ENA signal to delay it for a certain period corresponding to the appropriate phase shift so that the leading edge of its output signal DT on a line 40 will correspond to the center of the horizontal blanking interval during its occurrence. Signal DT is then processed by a logic circuit 42 to produce an FHDFB signal on a line 44 which is used in a phase detector 46 as a reference signal to phase lock the flyback signal from a line 48. The output of the phase detector 46 is filtered by a low pass filter 50 which develops a correction signal on a line 52. This signal is supplied to a variable delay circuit 54 which delays the DT signal it receives on line 56 such that the flyback signal will be in phase with the FHDFB. The output of variable delay circuit 54 is divided by a divide circuit 58 and then supplied to a horizontal drive circuit 60 from which the flyback signal is tapped on line 48 to close loop 36 at phase detector 46. Also, the output of horizontal drive circuit 60 is supplied via a line 62 to the horizontal yoke for controlling the horizontal scan of the raster display.

The low pass filter in loop 36 has a relatively fast time constant so that variations between the FHDFB signal and the flyback signal are rapidly corrected. This insures that the displayed signal does not bend during very "bright" scenes.

The advantages of the two loop system include the isolation of the noise from the horizontal sync signal in the first loop to develop a steady reference signal which is relatively noise immune. This reference signal can then be processed through the second loop which can then quite rapidly adjust for changes between the reference signal and the flyback signal. Also, within the second loop 36, the picture centering circuit 38 provides for a variable phase delay in the reference signal ENA, supplied by loop 20, for causing the picture to be centered on the screen.

Figure 4:
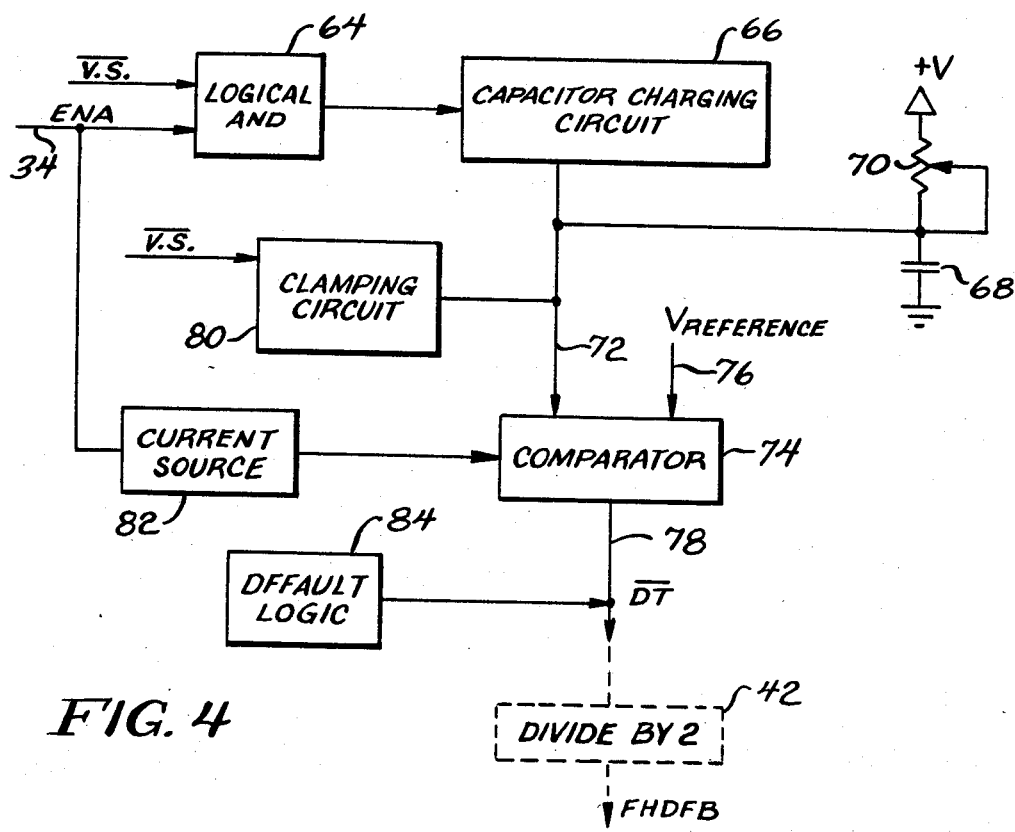
FIG. 4 is a further block diagram illustrating the preferred embodiment of the circuitry of the picture centering circuit.

FIG. 4 shows a representative block diagram illustrating the circuitry of the picture centering circuit 38 from FIG. 3. It should be noted that the picture centering circuit is more than simply a variable delay, although that is one of its principal functions. Specifically, the picture centering circuit 38 receives the ENA signal on a line 34 which is then tested through a logic circuit 64 to determine whether vertical sync is present. If not, the ENA signal is passed to a capacitor charging circuit 66. The receipt of the ENA signal by the capacitor charging circuit 66 allows the charging of an associated capacitor 68 according to the RC time constant which can be variably controlled by a variable resistor 70. The resulting signal is displayed on a line 72 and is measured by a comparator 74 against a reference voltage presented on a line 76 to the other input to the comparator 74. When the signal on line 72 exceeds the reference on line 76 the signal DT is generated on a line 78 as an output of comparator 74. The signal DT is then processed by the divide circuitry 42 to produce the reference signal FHDFB as explained above in conjunction with FIG. 3.

Also shown in FIG. 4 are additional devices illustrating further aspects of the picture centering circuit. Specifically, a clamping circuit 80 is designed to keep the signal on line 72 from exceeding a maximum value. However, this clamping action is activated only by the presence of vertical sync and will be discussed more fully below. Also, a current source 82 is enabled only when the signal ENA is present on a line 34. Thus, comparator 74 receives current only when the ENA signal is present. Additionally, a default circuit 84 provides a DT pulse on a line 78 in the absence of the appropriate signal on line 72 following the receipt of the horizontal sync pulse.

Figure 5:
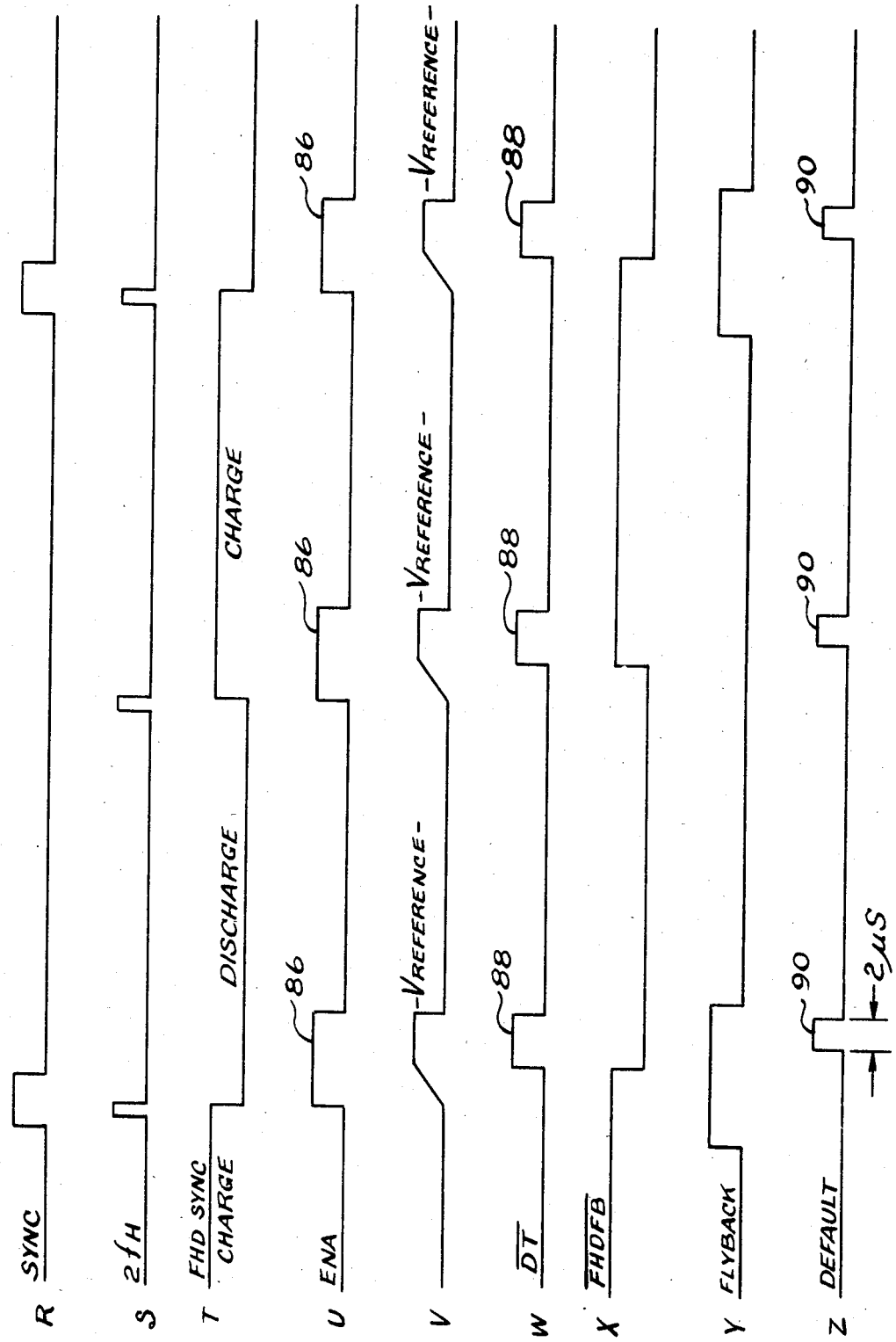
FIG. 5 is timing diagram showing various signals in the circuit of the present invention.

FIG. 5 illustrates a series of waveforms representative of the signals at various points throughout the two loops of the system of the preferred embodiment. The nine signals shown in FIG. 5 represent the derivation of the various input and reference signals. Specifically, waveform R represents the sync signal which is received by the phase detector 22 on line 32.

Waveform S is a derived signal which is present in the divide/decode logic circuit 28 as a result of the division of the 16 fH frequency from the voltage controlled oscillator 26. This signal S is then used to develop the ENA signal on line 34 and shown as waveform U. This signal is supplied to divide circuit 30 of FIG. 3 to produce the FHDSync signal shown as waveform T in FIG. 5.

Waveform V represents the voltage on capacitor 68 as explained more fully below.

Waveform W is then the $\overline{DT}$ signal which is produced at the output of the picture centering circuit 38 and then processed through logic circuit 42 to create the $\overline{FHDFB}$ signal shown as waveform X on line 44.

Waveform Y is the flyback signal for the now centered display.

Waveform Z is the default conditional pulse produced by the default logic circuit 84 of FIG. 4.

More specifically, the sync signal, waveform R, is used to phase lock the voltage controlled oscillator 26. The output of oscillator 26, a 16 fH frequency signal, is then divided and decoded to produce waveform U, the ENA signal. This is then divided to create the FHDSync signal, waveform T, which is used in phase detector 22 to lock with the horizontal sync of waveform R.

The enabling signal ENA shown as waveform U is a series of pulses 86 each having a duration of about six microseconds. As explained above, these are processed through the picture centering circuit 38 to produce the logical inverse of signal $\overline{DT}$ shown as waveform W having a series of pulses 88. These pulses 88 are of variable width as explained above because they are generated at a variable delay period after the initiation of the ENA pulses 86. This is controlled by comparator 74 which produces the $\overline{DT}$ output on line 78 when the voltage of capacitor 68 on line 72 reaches the reference voltage on line 76 as shown in waveform V. The signal V is held at about the reference voltage by the clamping circuit 80 until the ENA signal terminates. The signal $\overline{DT}$, waveform W, is then further divided as shown in FIG. 4 to derive the signal $\overline{FHDFB}$, waveform X. As illustrated by the timing diagram in FIG. 5, the initiation of the FHDFB signal corresponds to the leading edge of the pulses 88 of waveform W, signal $\overline{DT}$.

It will be appreciated from the relationships of the various diagrams of FIG. 5 that the flyback signal of waveform Y is now centered on the trailing edge of the $\overline{FHDFB}$ signal (corresponding to the leading edge of the FHDFB signal) rather than on the the horizontal sync pulses of waveform R. That is, the center of the flyback signal has been effectively delayed for a period after the original sync signal to more fully approximate the centering of the flyback signal with respect to the horizontal blanking interval.

FIG. 5 also illustrates waveform Z which is the default condition signal. It has pulses 90 which are of uniform width, approximately two microseconds. These pulses 90 are generated by the default logic circuitry 84 and are produced about four microseconds after the initiation of each ENA pulse 86. As mentioned above, these are then processed through the logic circuit 42 to produce the FHDFB signal. Thus, even in the absence of a $\overline{DT}$ signal, the FHDFB signal will be generated at most four microseconds after the initiation of each ENA pulse 86.

Figure 6:
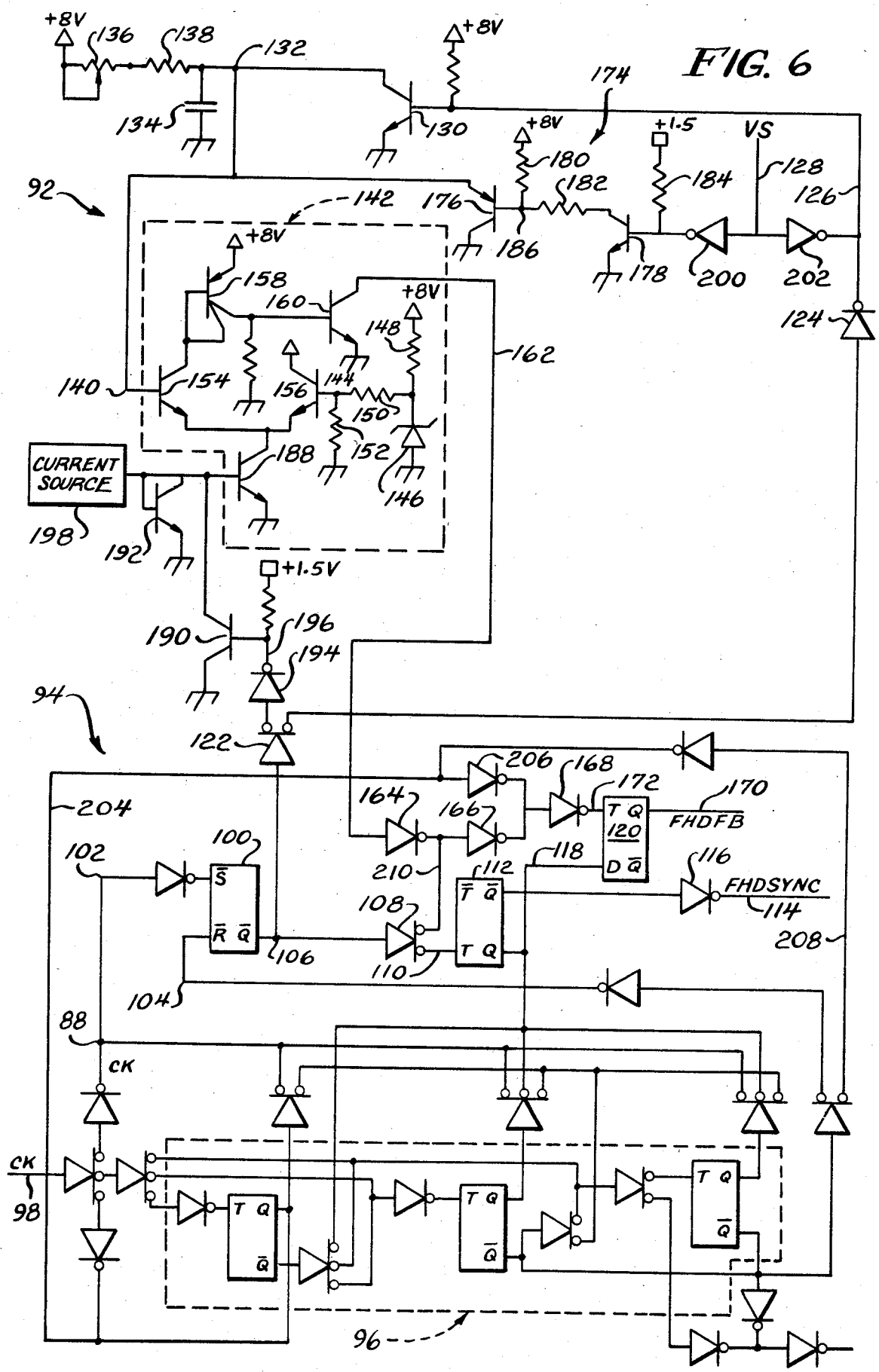
FIG. 6 is a schematic showing a detailed circuit of several portions of the preferred embodiment of the present invention.

FIG. 6 shows a detailed schematic of the horizontal picture centering circuit and several associated logic circuits of the block diagram shown in FIG. 3. Generally, the schematic illustrates the variable delay and associated devices 92 of loop 36 and also illustrates the timing and logic divide circuits 94 of loop 36 and 20, e.g., a divide-by-eight counting circuit 96.

More particularly, the circuit of FIG. 6 receives a clock input signal (typically having about a four microsecond period) on a line 98. This clock signal is processed through counter 96 and is ANDed with the negative outputs of each stage of counter 96 to form the set signal for flip-flop 100 on a line 102. This signal corresponds to the leading edge of the ENA signal. The combined negative outputs of the second and third stages of counter 96 on a line 104 form a reset signal for flip-flop 100. This reset signal corresopnds to the trailing edge of the ENA signal. Correspondingly, the $\overline{Q}$ output of flip-flop 100 on a line 106 is the $\overline{ENA}$ signal.

The $\overline{ENA}$ signal on line 106 is inverted by gate 108 to produce a correspondingly inverted signal on a line 110 which toggles a flip-flop 112 thus dividing the ENA signal by two to produce the FHDSync signal on a line 114 through an inverter 116. The Q output of flip-flop 112 is communicated by a line 118 to the D input of a flip-flop 120 to ensure that the FHDFB signal generated by the $\overline{DT}$ on line 122 is in proper phase with FHDSync.

The $\overline{ENA}$ signal on line 106 is communicated through gates 122 and 124 to produce the $\overline{ENA}$ signal on a line 126, as long as vertical sync, VS, is not present on a line 128. The presence of the $\overline{ENA}$ signal on line 126 turns off a transistor 130. When transistor 130 is turned off, a node 132 will experience a rise in potential as a capacitor 134 is charged from the current through resistors 136 and 138. In this context, variable resistor 136 may be varied to change the RC time constant of the circuit of resistors 136 and 138 and capacitor 134. It will be appreciated then that the voltage present at node 132 is a function of time, initiated when transistor 130 is turned off by the enabling signal on line 126, which can be varied by changing the RC time constant through the variance of resistor 136.

As node 132 increases in potential so does an input 140 to a comparator 142. The other input to comparator 142 is a reference voltage at input 144 generated by a Zener diode 146 and a resistor circuit consisting of resistors 148, 150, and 152. Comparator 142 acts as a standard comparator; when the voltage from capacitor 134 represented at node 140 exceeds the reference voltage at node 144, the comparator will "turn on" and produce an output on a line 162 through the action of transistors 154, 156, 158, and 160. This output on line 162 is the DT signal which is then communicated through gates 164, 166 and 168 to the input of flip-flop 120 causing it to toggle and produce the FHDFB signal on a line 170. The signal present at the T input to flip-flop 120 on a line 172 is the $\overline{DT}$ signal discussed above.

It will be appreciated then that the toggling of flip-flop 120 occurs at some time after the initiation of the enabling signal ENA due to the time required for capacitor 134 to charge. The charging of this capacitor 134 drives the voltage at input 140 to comparator 142 past the reference voltage at input 144 some time after the initiation of the enabling signal ENA. Thus, the length of delay for producing the FHDFB signal can be controlled by controlling the resistance in the RC network of capacitor 134 to control the rate of charging for capacitor 134.

To avoid unnecessary, excessive charging of the circuit once the FHDFB signal has been produced, a clamping circuit 174 having transistors 176 and 178 with associated resistors 180, 182 and 184 is used to clamp the voltage at node 132 at some predetermined level. In this context, transistor 176 will turn on when the voltage at node 132 exceeds by a threshold margin the voltage at node 186. Normally, transistor 178 is on during the nonvertical sync period so that the voltage at node 186 is controlled by the resistance network of resistors 180 and 182.

As explained above in connection with FIG. 4, the enabling pulse ENA also turns on the current source for the comparator 142. This occurs through the action of transistors 188, 190, and 192. More specifically, the ENA signal is inverted by a gate 194, thereby causing a low signal to be present on line 196 during the enabling period. Thus, transistor 190 will turn off to eliminate a current shunt from a current source 198. This turns on transistor 188 and transistor 192 and allows current to flow to the comparator 142.

Also, as explained above in connection with FIG. 4, it is desirable that the clamping circuit not clamp the voltage at node 132 during the vertical sync periods. This is accomplished by sensing for vertical sync on a line 128. When vertical sync is detected, gate 200 acts to turn off a transistor 178 which then keeps transistor 176 from turning on which in turn allows node 132 to charge to its peak value. Also, the action of gate 202 controls the signal to transistor 130, thus preventing it from turning on during the vertical sync period. In this fashion, the IC pin at node 132 may also be used to receive the vertical sync information because the horizontal centering function is unimportant during the vertical sync period in which such information occurs.

In order to provide for default protection, signals are generated in a timing circuit 182 to provide a default $\overline{DT}$ pulse on line 172 to flip-flop 120. This might be necessary if, for instance, node 132 were accidentally grounded during the ENA enabling period. That would keep comparator 142 from producing an output to toggle flip-flop 120, because input 140 would never rise above the reference at input 144. To avoid this, a pulse is provided via lines 208 and 204 to gate 206 approximately four microseconds after the generation of the ENA enabling signal. This produces the desired $\overline{DT}$ signal on line 172 which toggles flip-flop 120 to produce the FHDFB signal.

Likewise, if node 132 were to be accidentally tied to a extraordinarily high value, there would be no time required for capacitor 134 to charge. The output of comparator 142 is therefore "on" (i.e. the collector of transistor 160 is low) as long as such a condition exists. Accordingly, the output of gate 164 is high which enables the ENA signal (originally generated by flip-flop 100) received on a line 210 form gate 108. This signal is communicated through gates 166 and 168 to 172 to toggle flip-flop 120 to produce the FHDFB signal on line 170.

Thus, the two default conditions produce a maximum range of approximately four microseconds in which the FHDFB signal can be produced after the initiation of the enabling signal ENA. That is, if node 132 is at an excessively high voltage, the FHDFB signal will follow immediately upon receipt of the ENA enabling pulse. On the other hand, if node 134 is tied to a low value, such as ground, the FHDFB signal will follow approximately four microseconds after the initiation of the ENA enabling signal.

It will be appreciated that the circuit shown in FIG. 6 may be incorporated in the circuitry associated with the block diagrams as shown in the earlier figures. Specifically, the FHDSync is supplied to the first loop for phase locking with the horizontal sync in the initial phase detector 22 of loop one as shown in FIG. 3. Likewise, the FHDFB signal on line 170 is provided to the phase detector 46 as shown in FIG. 3, for phase locking with the fly back signal.

As mentioned above, the picture centering of the present invention may be accomplished in a single loop phase lock loop system as shown in FIG. 7. In such a system, the phase correction aspect of the present invention is incorporated into a simpler embodiment. Sync is received by a phase detector 212 on a line 214 and the output of the phase detector is passed to a low pass filter 216 which controls a voltage controlled oscillator 218 similarly to the above described embodiment. After the output of oscillator 218 is divided by divide circuit 220, a variable delay circuit 222, controlled by the picture centering circuit 224, introduces a phase correction factor into the phase lock loop similarly to of the picture centering function in loop 36 of FIG. 3. Likewise, the resulting signal is further divided by a divide circuit 226 to supply a horizontal drive circuit 226 to supply a horizontal drive circuit 228 and, in turn, a sweep circuit 230 which produces the new phase corrected flyback on a line 232. This flyback signal is processed through a integrater 234 to produce a flyback saw signal (similar to the one illustrated in FIG. 2A) on a line 236 which is then phase locked with the sync received on line 214 by phase detector 212. Thus, the flyback signal on line 232 has been more nearly aligned with the horizontal blanking interval while the flyback saw signal does not have the offset illustrated in waveform (vi) of FIG. 2B. Accordingly, the picture centering function may be accomplished through phase correction in a single loop horizontal phase lock loop system without introducing an offset and its associated noise immunity degradation problems.

Also, the picture centering of the present invention may be accomplished through a modified two loop horizontal phase lock loop system as illustrated in FIG. 8 which is similar in most respects to the preferred embodiment illustrated in FIG. 3. However, in the system of FIG. 8, the picture centering phase correction is introduced into the first loop and subsequently communicated to the second loop for locking with the flyback. That is, the flyback signal is phase locked with a sync derived, phase adjusted, signal just as in the preferred embodiment.

More particularly, horizontal sync is received by an initial phase detector 238 on a line 240. The output of phase detector 238 is communicated to a low pass filter 242 which controls a voltage controlled oscillator 244 whose output is divided and decoded by logic circuit 246 to produce an ENA signal at a node 248. This ENA signal on line 248 is communicated to a variable delay circuit 250 which is controlled by a picture centering circuit 252 to introduce the appropriate phase correction into the system. The output of variable delay circuit 250 is then further divided by divide circuit 254 to produce a signal on line 256 as an input to phase detector 238 to close a first loop 258. Thus, the horizontal sync received on line 240 will be phase locked with the signal on line 256 and the appropriate phase delay will be introduced into the loop.

Accordingly, the ENA signal at node 248 may be simply divided by divide circuit 260 to provide one input to the loop 262 phase detector 264. In contrast, the embodiment of FIG. 3 introduces the picture centering phase correction outside the first loop. However, similarly to the circuit of FIG. 3, the circuit of FIG. 8 provides the phase corrected signal via line 266 to a variable delay circuit 268 in loop 262. Likewise, in a fashion similar to the circuit of FIG. 3, variable delay circuit 268 is controlled by a low pass filter 270 which receives the output of the phase detector 264 on a line 272. The output of the variable delay circuit 268 is further divided by divide circuit 274 and communicated to a horizontal drive circuit 276. The output of the horizontal drive circuit 276 is the flyback signal which is supplied via line 280 to phase detector 264 to close loop 262. The flyback signal is also supplied via line 282 to the horizontal yoke to control the horizontal scan of the raster display. Thus, the flyback signal on line 280 will be phase locked with a sync derived, phase adjusted, reference signal on line 284 which has been phase corrected to more nearly align the flyback signal with the horizontal blanking interval.

Such modifications and interconnections as would typically be used to incorporate the present invention into a television receiver have been omitted in the interest of describing the present invention with particular clarity, but would be readily apparent to one skilled in the art and familiar with the teachings of this application.

Similarly, different elements or interconnections may be used to effectuate particular circuit functions without escaping the spirit and scope of the present invention as defined by the appended claims. Such substitutions and modifications would be apparent to one skilled in the art and familiar with this application.

What is claimed:

1. In a television receiving system for processing a transmitted signal bearing video and horizontal synchronizing information, said system having a display means for displaying said video information serially in a raster-like fashion in cooperation with a flyback signal coordinated with said horizontal synchronizing information, a method for centering said video information on said display means comprising:
   receiving said transmitted signal;
   generating a reference signal including developing an enabling signal from said horizontal synchronizing information in said received signal and variably delaying said enabling signal to produce said reference signal; and
   synchronizing said flyback signal with said reference signal.

2. The method of claim 1 wherein said synchronizing step includes
   variably delaying said reference signal in response to a phase comparison of the flyback signal and a signal derived from said reference signal before it has been variably delayed.

3. The method of claim 1 wherein said step of developing an enabling signal includes:
   exciting a oscillator in response to said horizontal sync information to produce a representative output; and
   decoding said oscillator output to produce said enabling signal.

4. The method of claim 3 further including:
   dividing said enabling signal to produce a sync reference signal; and
   synchronizing said sync reference signal with said sync information to produce a phase locked signal for exciting said oscillator.

5. The method of claim 1 wherein said step of variably delaying said enabling signal includes:
   generating an enabling duration signal representative of the duration of said enabling signal; and
   variably triggering the initiation of said reference signal in response to said enabling duration signal.

6. The method of claim 5 wherein said variable triggering of said reference signal includes:
   comparing said enabling duration signal to a reference;
   generating an intermediate signal in response to said comparison; and
   generating said reference signal in response to said intermediate signal.

7. The method of claim 6 wherein generating said reference signal comprises:
   decoding said intermediate signal to derive said reference signal.

8. The method of claim 6 further including:
   testing for the presence of circuit default conditions; and
   generating said intermediate signal in response to the presence of circuit default conditions.

9. The method of claim 6 further including:
   determining the presence of said enabling signal; and
   supplying current for said comparing only when said enabling signal is present.

10. The method of claim 5 further including:
    clamping said enabling duration signal at a predetermined magnitude.

11. The method of claim 10 further including:
    disabling said clamping during vertical sync periods; and
    disabling said enabling signal during vertical sync periods.

12. In a television receiving system for converting a transmitted signal bearing video and horizontal sync information into a visual display on a corresponding display means, said horizontal sync information occurring non-symmetrically during a non-video interval, a method for providing a signal which occurs symmetrically during said non-video interval comprising the steps of:
receiving said horizontal sync information; and
generating a modifiable signal in response to said receipt, said modifiable signal being alterable to reflect the time of occurrence of said horizontal sync information during said non-video interval, said generating step including
developing an enabling signal from the received horizontal sync information and
variably delaying said enabling signal to cause it to correspond to the time-center of said non-video interval.

13. The method of claim 12 wherein developing an enabling signal includes:
exciting an oscillator circuit to produce an output in response to said receipt of said horizontal sync information; and
decoding said oscillator output to develop said enabling signal.

14. The method of claim 12 further including:
providing a substantially noise immune enabling signal by phase coordinating said enabling signal with said received horizontal sync information.

15. The method of claim 12 wherein said step of variably delaying said enabling signal includes:
detecting said enabling signal;
developing a variable representative signal in response to said detection, said signal having a magnitude variably representative of the length of time from said detection;
monitoring said representative signal; and
generating an output signal when the magnitude of said representative signal reaches a predetermined value.

16. In a television receiving system for processing transmitted signals bearing at least video information and horizontal synchronizing information, said system having a display means for displaying said video information serially in a raster-like fashion in cooperation with a flyback signal coordinated with said horizontal synchronizing information, the improvement comprising:
means for receiving said transmitted signal;
a reference signal generator coupled to said means for receiving and providing a variable phase delay in response to said horizontal synchronizing information in said transmitted signal, said reference signal generator including means for developing an enabling signal from said horizontal synchronizing information and
means for variably delaying said enabling signal to produce said reference signal; and
means for synchronizing said flyback signal with said reference signal.

17. The system of claim 16 wherein said developing means includes:
means for exciting a oscillator in response to said horizontal sync information to produce a representative output; and
decoding means for decoding said oscillator output to produce said enabling signal.

18. The system of claim 17 further including:
dividing means for dividing said enabling signal to produce a sync reference signal; and
synchronizing means for synchronizing said sync reference signal with said sync information to produce a phase locked signal for exciting said carrier oscillator.

19. The system of claim 16 wherein said variable delay means includes:
generating means for generating an enabling duration signal representative of the duration of said enabling signal; and
variable triggering means for triggering the initiation of said reference signal in response to said enabling duration signal.

20. The system of claim 19 wherein said variable triggering means includes:
comparing means for comparing said enabling duration signal to a predetermined level;
generating means for generating an intermediate signal in response to said comparison; and
second generating means for generating said reference signal in response to said intermediate signal.

21. The system of claim 20 wherein said second generating means includes decoding means for decoding said intermediate signal to derive said reference signal.

22. The system of claim 20 further including:
testing means for testing for the presence of circuit default conditions; and
further generating means for generating said intermediate signal in response to the presence of said circuit default conditions.

23. The system of claim 20 further including:
determining means for determining the presence of said enabling signal; and
current source means for supplying current for said comparing means only when said enabling signal is present.

24. The system of claim 19 further including clamping means for clamping said enabling duration signal at a predetermined magnitude.

25. The system of claim 19 further including:
disabling means for disabling said clamping means during vertical sync periods; and
disabling means for disabling said enabling signal during said vertical sync periods.

26. In a television receiving system for converting a transmitted signal bearing at least video information and horizontal sync information into a visual display on a corresponding display means, said horizontal sync information occurring nonsymmetrically during a non-video interval in said transmitted signal, improved means for providing a signal which occurs symmetrically during said non-video interval comprising:
receiving means for receiving said horizontal sync information; and
generating means responsive to said receiving means for generating a modifiable signal to reflect the time of occurrence of said horizontal sync information during said non-video interval, said generating means including developing means for developing an enabling signal upon receipt of said horizontal sync information and variable delay means for delaying said enabling signal to cause it to correspond to the time-center of said non-video interval.

27. The system of claim 26 wherein said developing means includes:

exciting means for exciting an oscillator circuit to produce an output in response to said receipt of said horizontal sync information; and decoding means for decoding said oscillator output to develop said enabling signal.

28. The system of claim 26 including improved means for providing a substantially noise immune enabling signal including phase coordinating means for phase coordinating said enabling signal with said horizontal sync information.

29. The system of claim 26 wherein said variable delay means includes:

detecting means for detecting said enabling signals;

developing means for developing a variable representative signal in response to said detection, said representative signal having a magnitude variably representative of the length of time from said detection;

monitoring means for monitoring said representative signal; and generating means for generating an output signal when the magnitude of said representative signal reaches a predetermined value.

30. In a television receiving system for converting a transmitted signal bearing video information and horizontal sync information into a visual display on a corresponding display means in a raster-like fashion whereby the horizontal return of the scanning beam is coordinated with a flyback signal, said horizontal sync information occurring nonsymmetrically during non-video intervals in said transmitted signal, improved means for horizontally centering the visual display on the display means including:

a first loop coupled for receiving said transmitted signal and phase locking said received signal with a generated timing derived signal, said first loop including a variable delay circuit interposing a variable delay in generating said timing derived signal; and a second loop coupled to receive said timing derived signal from said first loop for generating a controllably delayed signal for phase locking with said flyback signal, wherein said controllably delayed signal is delayed to compensate for the nonsymmetry of said horizontal sync information in said non-video intervals thereby causing said flyback signal to occur symmetrically with respect to said non-video interval.

31. The system of claim 30 further including:

first filter means in said first loop, said first filter means having a relatively slow time constant, whereby said first loop provides substantial noise immunity for said system.

32. The system of claim 30 further including:

second filter means in said second loop, said second filter means having a relatively fast time constant, whereby said second loop responds quickly to correct any deviations in said visual display.

* * * * *